United States Patent [19]
Calvin

[11] 3,732,439
[45] May 8, 1973

[54] PULSE PRODUCING CIRCUIT PARTICULARLY ADAPTED FOR BUTTON TYPE TELEPHONES

[76] Inventor: Noel M. Calvin, 2683 Buena Vista Way, Berkeley, Calif. 94708

[22] Filed: Nov. 28, 1969

[21] Appl. No.: 880,592

[52] U.S. Cl. .............307/284, 179/90 R, 307/224 B, 340/359

[51] Int. Cl. .............H04k 23/30

[58] Field of Search..................340/359, 345, 365, 340/362; 179/90 R, 90 K; 328/61, 37, 48; 307/220 R, 220 B, 221 R, 221 B, 252 K, 225 B, 284

[56] References Cited

UNITED STATES PATENTS

| | | | |
|---|---|---|---|
| 3,500,068 | 3/1970 | Holz | 307/225 B |
| 3,204,123 | 8/1965 | Mahoney | 307/284 |
| 3,581,216 | 5/1971 | Stevenson | 179/90 R |
| 3,503,067 | 3/1970 | Amiragoff | 340/359 |
| 2,428,089 | 9/1947 | Mumma | 340/359 |
| 2,849,539 | 8/1958 | Abbott | 179/90 K |
| 2,818,558 | 12/1957 | Abbott | 340/359 |
| 2,373,134 | 4/1945 | Massonneau | 179/90 |

*Primary Examiner*—Kathleen H. Claffy
*Assistant Examiner*—Thomas D'Amico
*Attorney*—Herzig & Walsh

[57] ABSTRACT

The invention is a chain counter circuit for producing output pulses adaptable for actuating a relay. The chain counter is particularly adapted to use with a button type telephone for supplying numbers of pulses corresponding to digits required to the telephone line. The chain counter comprises 10 stages, each of which is similar to a mono-stable multi-vibrator. Each stage when activated by an incoming signal produces, after a predetermined time delay, a pulse in the output circuit and a triggering pulse for activating the next stage in sequence. The stage then deactivates itself. The number of output pulses depends upon which stage is initially actuated.

1 Claim, 4 Drawing Figures

PATENTED MAY 8 1973 3,732,439

INVENTOR
NOEL M. CALVIN

BY Herzig & Walsh
ATTORNEYS

PULSE PRODUCING CIRCUIT PARTICULARLY ADAPTED FOR BUTTON TYPE TELEPHONES

SUMMARY OF THE INVENTION

The invention is a chain counter circuit adapted for producing electrical pulses. The type of pulse output of the circuit can be adapted for actuation of relays and accordingly the chain counter circuit accommodates itself idealy to use with button type telephones. This is particularly true with respect to that type of telephone equipment wherein the hand set telephone embodies switches, one for connecting the instrument to the line and another for purposes of transmitting pulses to the line in numbers corresponding to a digit which in conventional equipment is dialed. The circuit of the invention produces two outputs one of which can be adapted to actuate a relay for connecting the instrument to the line and the other of which is the pulse output, the number of pulses corresponding to the digit activated by a button.

In the preferred form of the invention the chain counter comprises 10 stages each of which is on the order of a mono-stable multi-vibrator providing for the two outputs, one to the output circuit and the other being a triggering pulse for activating the next stage in the sequence. The initial pulse may be applied by pressing a button connecting to any individual one of the stages in the series or group, the number of output pulses depending upon which stage has an input signal applied to it. This specific circuitry of the preferred form of the invention is described in detail hereinafter.

The primary object of the invention is to provide an improved pulse producing circuit in the form of a chain counter adapted to produce electrical pulses adaptable for actuation of a relay and thus adapted to use in button type telephone equipment wherein the instrument is connected to the line by way of a relay and pulses are transmitted by way of a second relay.

A further object of the invention is to provide a chain counter circuit of this type providing for suitably controlled time delays between pulses.

A further object is to provide a circuit of this type embodying circuit components adapted to prevent the pulse to the output circuit from a stage from triggering a stage and for turning off a preceding stage upon activation of a next stage.

Further objects and additional advantages of the invention will become apparent from the following detailed description and annexed drawings, wherein.

Figures 1, 2:
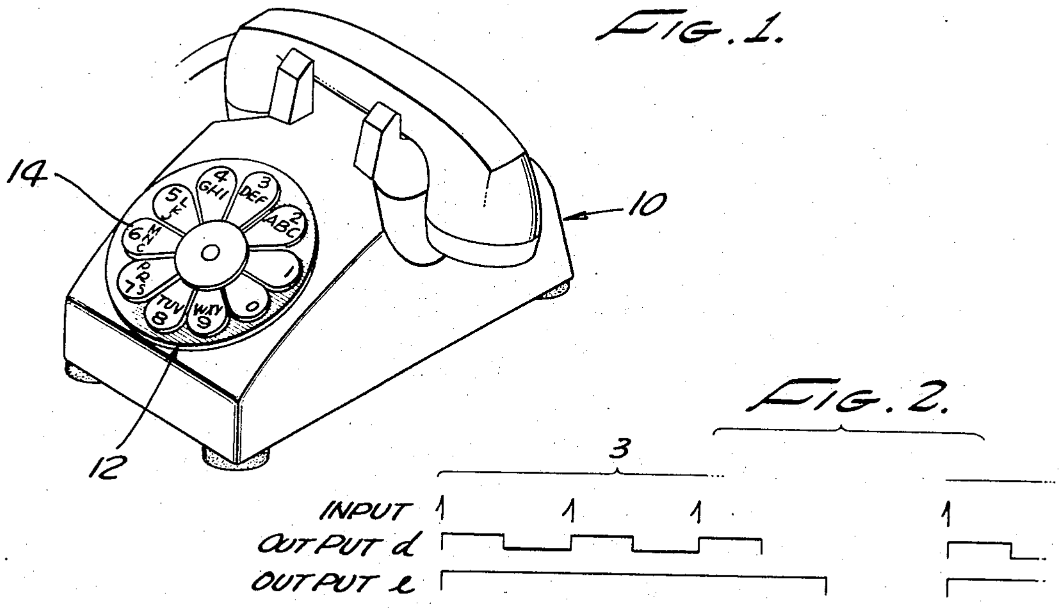
FIG. 1 is a perspective view of a telephone provided with an arrangement of 10 manually operated switch buttons.
FIG. 2 is a graph illustrating the electrical outputs of the circuit of the invention.

FIG. 1 shows at 10 a telephone instrument of generally typical configuration except that it is equipped to be button operated. In stead of having a dial on the front surface of the telephone, there is provided a disc or platform 12 associated with which is an array or pattern of ten manually operatable members or switch buttons, as designated at 14, whereby the telephone is actuated, instead of by dialing. Telephone equipment such as instruments of the type shown, typically are equipped with a switch which connects the phone to the telephone line and a second switch whereby pulses are applied to the line in response to dialing, the number of pulses corresponding to the digit dialed. In other words, the signal output of the phone typically is as represented in FIG. 2. The digit dialed produces two outputs as designated at *d* and *e*. Output *e* represents actuation of the line relay and output d represents the series of pulses resulting from the dialing of the individual digits. The circuitry of the herein invention produces this same type of electrical output, but in response to operation of 10 buttons rather than in response to dialing. In a preferred form as shown in FIG. 1 the switch members are in the form of a 10 petalled clover leave, formed for example from brass to be attractive in appearance.

Figure 3:
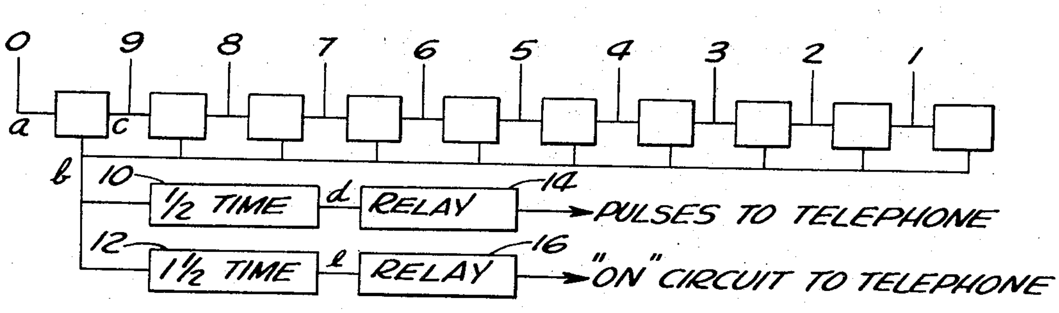
FIG. 3 is a block diagram illustrating the chain counter, that is, the pulse producing circuitry of the invention, and the components associated with the telephone.

The circuit of the invention which produces the desired outputs in response to button actuation is a chain counter which is represented in the block diagram FIG. 3. The components of the circuitry are not large in size and the circuit can be built into the telephone or it can be in a separate housing with a cord plugging it into a wall outlet. With the exception of the power supply and the output isolation relays, the circuit can be built as a single module.

The chain counter as illustrated in the block diagram FIG. 3 is a made up of ten sections or stages which are similar to mono-stable multi-vibrators. Each section which, as stated, is on the order of mono-stable multivibrator has three wires connecting to it, as illustrated at *a*, *b*, and *c*, as shown in FIG. 3. Wire *a* is the input connection, and wires *b* and *c* represent outputs to the output circuit and to the next stage, respectively. At rest, when no pulse or signal has been applied to input *a*, outputs *b* and *c* are off. When a pulse is applied at *a*, outputs *b* and *c* remain off for a predetermined time and then on for a very short time. The time delay is determined by the constants of the circuit. The pulse at output *c* is led to the next stage, as shown, and the output *b* is fed to the output circuits, as will be described. The numerals 0 to 9 in FIG. 3 represent the 10 buttons identified by these digits, it being understood that if a button identified by a particular digit is pressed that number of pulses is produced.

The time delay in each stage or section is set to one second, for example. If a pulse is fed in from the 0 button, this triggers the first stage into operation. After one second this stage produces pulses at the *b* and *c* outputs and then turns off. The pulse at *c* triggers, that is, turns on the next stage, and the pulse at *b* is fed to the output circuits. After another second, for example, the second stage produces pulses at its corresponding *b* and *c* outputs and turns off. This feeds the second pulse to the output circuits and turns the third stage on, and after one second the third stage turns the fourth stage on and feeds another pulse to the output circuit and turns off. This continues until the last stage is reached, and ten pulses are produced.

If the initial pulse is applied at, say, for example, the No. 2 input, that is from the No. 2 digit button, the same process takes place, except that only two pulses are produced, as only two units, or stages, of the chain counter operate. Similarly, if the input pulse is applied through the No. 1 connection, only one pulse is produced and supplied to the output.

Preferably, the output circuit consists of two monostable multi-vibrators connected through amplifiers to relays, the multi-vibrators being designated at 10 and 12, having outputs *d* and *e*, and the relays being designated at 14 and 16. The multi-vibrator 10 is preferably set to a delay or stretch time of approximately one-half that of the chain counter units. The second multi-vibrator 12 is adjusted to a time delay or stretch of approximately 1½ times that of the chain counter units. Each successive pulse turns the first on for a short length of time and resets the second, as illustrated in the diagram FIG. 2. As may be seen, the two outputs normally required by a telephone of the type referred to are provided, i.e., a train of pulses and one output which turns on the connecting circuit while the pulse circuitry is in operation.

The foregoing illustrates the nature of the circuit and the type of operation secured. As will be observed, the device is basically digital, but uses neither a pulse generator nor binary counter. The chain counter shown might be used to operate a stepping switch as well.

Figure 4:
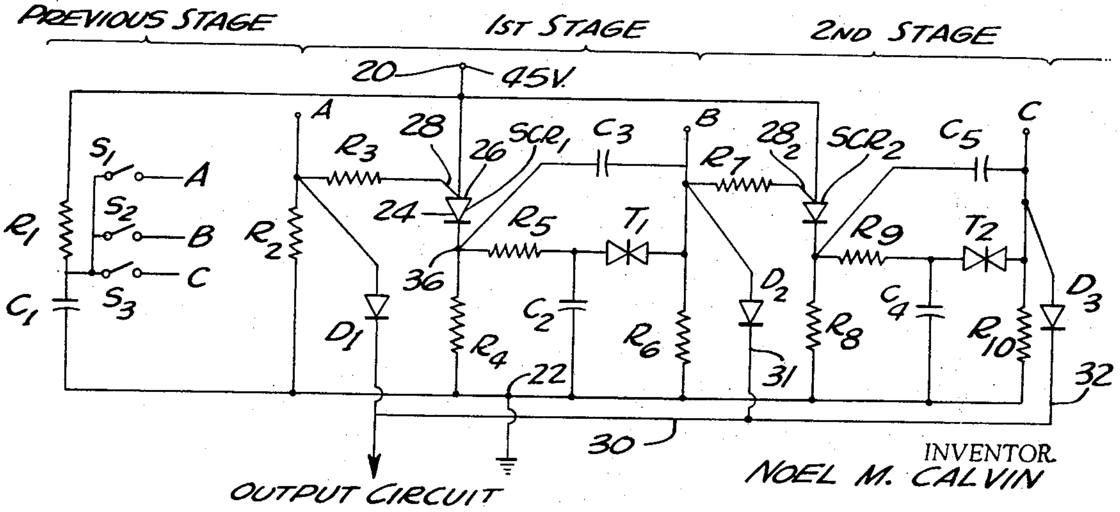
FIG. 4 is a circuit diagram of the chain counter circuitry.

FIG. 4 is an actual preferred form of circuitry constituting three units or stages of the chain counter. In the circuit shown, a positive voltage of 45 volts, for example, is applied at the terminal 20, and the terminal 22 is grounded.

FIG. 4 shows the circuitry for two complete stages, the remaining of the ten stages being similar and the operation being the same, the operation being understandable from the three stages shown.

The characters A, B, and C represent three digital inputs from buttons, switches being designated at $S_1$, $S_2$, and $S_3$. Associated with the input circuits are the resistor $R_1$ and capacitor $C_1$. The character $SCR_1$ of the first stage is a silicon controlled rectifier, preferably a low power Thyristor and component $D_1$ is a diode. The $SCR_1$ has a cathode 24, and anode 26 and a gate 28. Connected between the terminal A and the gate 28 is a resistor $R_3$, and connected between this terminal and ground is resistor $R_2$. The A terminal connects to the diode $D_1$, which in turn connects by wires 30, 31, and 32 to successive diodes $D_2$ and $D_3$ of subsequent stages. The cathode 24 of $SCR_1$ connects through the resistor $R_4$ to ground and its anode is connected to the terminal 20. Terminal 36 connecting to cathode 24 connects through the resistance-capacitant circuits $R_5$ and $C_2$ to ground, and this circuit is connected through the silicon four-layer bilateral trigger $T_1$ and resistor $R_6$ to ground. The latter network connects to Terminal B and through capacitor $C_3$ is connected back to cathode 24 of $SCR_1$. The circuitry of subsequent stages or units is similar.

Next will be described the detailed operation of the chain counter.

CHAIN COUNTER OPERATION

If switch $S_1$ is closed to Terminal A, the stages shown would produce three pulses. $C_1$ normally charges through resistor $R_1$. When $S_1$ is pressed capacitor $C_1$ discharges through resistor $R_2$, producing a pulse through resistor $R_3$, and at the gate 28 of $SCR_1$ and at the output circuit through diode $D_1$. The voltage pulse at the gate 28 of $SCR_1$ turns it on, that is, triggers it, and capacitor $C_2$ begins to charge through $SCR_1$ and resistor $R_5$. When capacitor $C_2$ reaches the breakdown voltage of $I_1$, which may be approximately 28 volts, $T_1$ turns on (conducts) and capacitor $C_2$ discharges through $T_1$ and resistor $R_6$. This produces voltage pulses at the cathode of $SCR_1$ through capacitor $C_3$ at the gate $28_2$ of $SCR_2$ through resistor $R_7$ and at the output circuit through diode $D_2$. The pulse at the cathode of $SCR_1$ reduces the current through it to zero, so this SCR turns off. The pulse at the gate of $SCR_2$ turns it on. Capacitor $C_4$ begins charging through $SCR_2$ and resistor $R_9$. When capacitor $C_4$ reaches the breakdown voltage of $T_2$ it discharges through $T_2$ and resistor $R_{10}$, turning $SCR_2$ off and producing the third pulse at the output circuit through diode $D_3$. The diode $D_1$, $D_2$, and $D_3$ prevent output pulses from triggering another stage. The circuit is now at rest and ready for the next trigger pulse, that is, the next pulse indicative of a digit to be transmitted to the line.

If switch $S_2$ is closed, $SCR_2$ is turned on in a manner as described in connection with $SCR_1$ and now only two pulses rather than three are fed to the output circuits. If switch $S_3$ is closed, only one pulse is fed to the output circuit.

The frequency of the device as shown is limited principally by the recovery time of the components $T_1$ and $T_2$, which is approximately 50 milliseconds. The frequency is determined by the magnitudes or resistor $R_5$ and capacitor $C_2$ and resistor $R_9$ and capacitor $C_4$. For exemplary values as given (45 volts) give a time delay of approximately 1/10th second. The number of stages can be increased unlimitedly.

I claim:

1. A device for the transmission of a series of electronic pulses, comprising:
   a. a plurality of N interconnected stages;
   b. means for applying an input signal from an external source to any individual stage without activating preceding stages;
   c. means in each stage for providing an output pulse to an output circuit, and for providing a triggering pulse for the next subsequent stage, whereby the number of pulses applied to the output circuit depends upon how many stages ahead of the Nth stage the signal is applied;
   d. each stage comprising a single silicon controlled rectifier having an anode, a cathode and a gate, said anode connected to a bias potential, said cathode connected to a ground, and said gate connected to said input signal whereby the silicon controlled rectifier is adapted to be gated either by a pulse from a previous stage or by an external input signal, said cathode also providing said triggering pulse across a timing capacitor and through a trigger to the next stage;
   e. said triggering pulse gating on the silicon controlled rectifier of the next stage;
   f. said triggering pulse generated by a stage turns off the silicon controlled rectifier of that stage;
   g. said capacitor having one terminal connected to the trigger device, and through a resistor to the cathode of said silicon controlled rectifier, said one terminal having only these connections, and the other terminal connected to ground.

* * * * *